United States Patent
Ouchi

(10) Patent No.: US 12,212,972 B2
(45) Date of Patent: Jan. 28, 2025

(54) ACCESS POINT DEVICE, CONTROL METHOD, AND COMPUTER-READABLE STORAGE MEDIUM FOR BSS COLOR SETTING

(71) Applicant: CANON KABUSHIKI KAISHA, Tokyo (JP)

(72) Inventor: Masatomo Ouchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 510 days.

(21) Appl. No.: 17/409,845

(22) Filed: Aug. 24, 2021

(65) Prior Publication Data
US 2021/0392502 A1     Dec. 16, 2021

Related U.S. Application Data

(63) Continuation of application No. PCT/JP2020/004218, filed on Feb. 5, 2020.

(30) Foreign Application Priority Data

Feb. 28, 2019   (JP) .................................. 2019-036408

(51) Int. Cl.
*H04W 28/00* (2009.01)
*H04L 41/0803* (2022.01)
(Continued)

(52) U.S. Cl.
CPC ......... *H04W 16/02* (2013.01); *H04L 41/0803* (2013.01); *H04W 28/18* (2013.01); *H04W 48/16* (2013.01); *H04W 84/12* (2013.01)

(58) Field of Classification Search
CPC ..... H04W 16/02; H04W 28/18; H04W 48/16; H04W 84/12; H04W 48/08; H04W 92/20; H04L 41/0803

See application file for complete search history.

(56) References Cited

U.S. PATENT DOCUMENTS

9,942,193 B1 *    4/2018  Chu ..................... H04W 84/12
2015/0282043 A1   10/2015 Fang
(Continued)

FOREIGN PATENT DOCUMENTS

CN   105633903 A   6/2016
CN   105915312 A   8/2016
(Continued)

OTHER PUBLICATIONS

Liwen et al (BSS Color in NDP Ranging, IEEE Draft; vol. 802.11az, May 7, 2018 (May 7, 2018)).*

(Continued)

*Primary Examiner* — Lakeram Jangbahadur
(74) *Attorney, Agent, or Firm* — Carter, DeLuca & Farrell LLP

(57) ABSTRACT

A communication device, which forms a first Basic Service Set (BSS), decides, based on a negotiation with a first other communication device to transmit a radio frame to a second other communication device cooperatively with the first other communication device, whether to set a BSS color in the first BSS to a first BSS color corresponding to the first BSS or to a second BSS color corresponding to a second BSS formed by the first other communication device, and sets the BSS color in the first BSS based on the decision.

13 Claims, 5 Drawing Sheets

(51) Int. Cl.
   *H04W 16/02* (2009.01)
   *H04W 28/18* (2009.01)
   *H04W 48/16* (2009.01)
   *H04W 84/12* (2009.01)

(56) References Cited

U.S. PATENT DOCUMENTS

| | | | | |
|---|---|---|---|---|
| 2016/0366637 | A1* | 12/2016 | Barriac | H04W 76/10 |
| 2017/0257817 | A1* | 9/2017 | Itagaki | H04L 69/325 |
| 2017/0273129 | A1 | 9/2017 | Ouchi | |
| 2018/0054759 | A1 | 2/2018 | Seok | |
| 2018/0205520 | A1* | 7/2018 | Lin | H04L 5/0091 |
| 2018/0270038 | A1* | 9/2018 | Oteri | H04W 72/1215 |
| 2018/0310245 | A1 | 10/2018 | Ouchi | |
| 2020/0008185 | A1* | 1/2020 | Chen | H04L 69/18 |

FOREIGN PATENT DOCUMENTS

| | | | | |
|---|---|---|---|---|
| CN | 106487489 | A | | 3/2017 |
| CN | 106941731 | A | | 7/2017 |
| CN | 106941731 | B | * 7/2017 | ............ H04W 74/08 |
| JP | 2018506219 | A | * 1/2015 | ............ H04W 72/15 |
| JP | 2018-050133 | A | | 3/2018 |
| WO | 2016/112306 | A | | 7/2016 |
| WO | 2016/154779 | A1 | | 10/2016 |
| WO | 2017/031640 | A1 | | 3/2017 |
| WO | 2017/036402 | A1 | | 3/2017 |
| WO | 2018/079015 | A1 | | 5/2018 |
| WO | 2018/093132 | A1 | | 5/2018 |

OTHER PUBLICATIONS

Park et al. (IEEE 802.11-18—Overview of PHY Features for EHT, Nov. 2018).*
International Search Report issued by the Japan Patent Office on Apr. 7, 2020 in corresponding International Application No. PCT/JP2020/004218, with English translation.
Chu, L. et al., "BSS Color in NDP Ranging" IEEE 802.11-18/893r0 (May 2018) pp. 1-6, XP068126114.
Extended European Search Report issued in corresponding EP Patent Application No. 20763371.0, dated Oct. 28, 2022.
Chinese Office Action issued in corresponding CN Patent Application No. 202080017299.5, dated Sep. 6, 2023, with English translation.
Notice of Reasons for Refusal issued by the Japanese Patent Office on Jan. 15, 2024 in corresponding JP Patent Application No. 2023-039878, with English translation.
Chinese Office Action issued in corresponding CN Patent Application No. 202080017299.5, dated May 8, 2024, with English translation.

* cited by examiner

EHT SU PPDU

EHT MU PPDU

EHT ER PPDU

ACCESS POINT DEVICE, CONTROL METHOD, AND COMPUTER-READABLE STORAGE MEDIUM FOR BSS COLOR SETTING

CROSS-REFERENCE TO RELATED APPLICATIONS

This application is a Continuation of International Patent Application No. PCT/JP2020/004218, filed Feb. 5, 2020, which claims the benefit of Japanese Patent Application No. 2019-036408 filed Feb. 28, 2019, both of which are hereby incorporated by reference herein in their entirety.

BACKGROUND OF THE INVENTION

Field of the Invention

The present invention relates to a communication device, a control method, and a computer-readable storage medium and, more particularly, to a communication control technique in a wireless LAN.

Background Art

As a communication standard concerning a wireless LAN (Wireless Local Area Network), the IEEE (Institute of Electrical and Electronics Engineers) 802.11 standard is known. In the IEEE802.11ax standard that is the latest standard of the IEEE802.11 standard series, not only a high peak throughput but also improvement of a communication speed under a congestion situation is implemented using OFDMA (Orthogonal Frequency-Division Multiple Access) (see PTL 1).

Currently, in order to further improve throughput, a study group called IEEE802.11EHT (Extremely High Throughput) has been formed as a successor standard of IEEE802.11 ax. In the EHT, to achieve throughput improvement, a Multi-AP Coordination configuration in which a plurality of access points (APs) arranged while being spatially distributed cooperatively transmit data to a single STA (Station) has been examined.

CITATION LIST

Patent Literature

PTL 1: Japanese Patent Laid-Open No. 2018-050133

In the IEEE802.11ax standard, use of identification information called BSS (Basic Service Set) color is defined. If a communication device receives a radio frame in which the same BSS color as the BSS color of an AP connected to the self-device is set, the radio frame is handled as a frame of Intra-BSS. On the other hand, in the IEEE802.11EHT, use of the Multi-AP Coordination configuration has been examined, as described above. How to set the BSS color in this case is not clear yet.

SUMMARY OF THE INVENTION

The present invention provides a technique of appropriately executing a setting for causing a plurality of access points to concurrently transmit data to a terminal.

According to one aspect of the present invention, there is provided a communication device comprising a forming unit configured to form a first Basic Service Set (BSS), a decision unit configured to decide, based on a negotiation with a first other communication device to transmit a radio frame to a second other communication device cooperatively with the first other communication device, whether to set a BSS color in the first BSS to a first BSS color corresponding to the first BSS or to a second BSS color corresponding to a second BSS formed by the first other communication device, and a setting unit configured to set the BSS color in the first BSS based on the decision by the decision unit.

Further features of the present invention will become apparent from the following description of exemplary embodiments with reference to the attached drawings.

DESCRIPTION OF THE EMBODIMENTS

Figure 1:
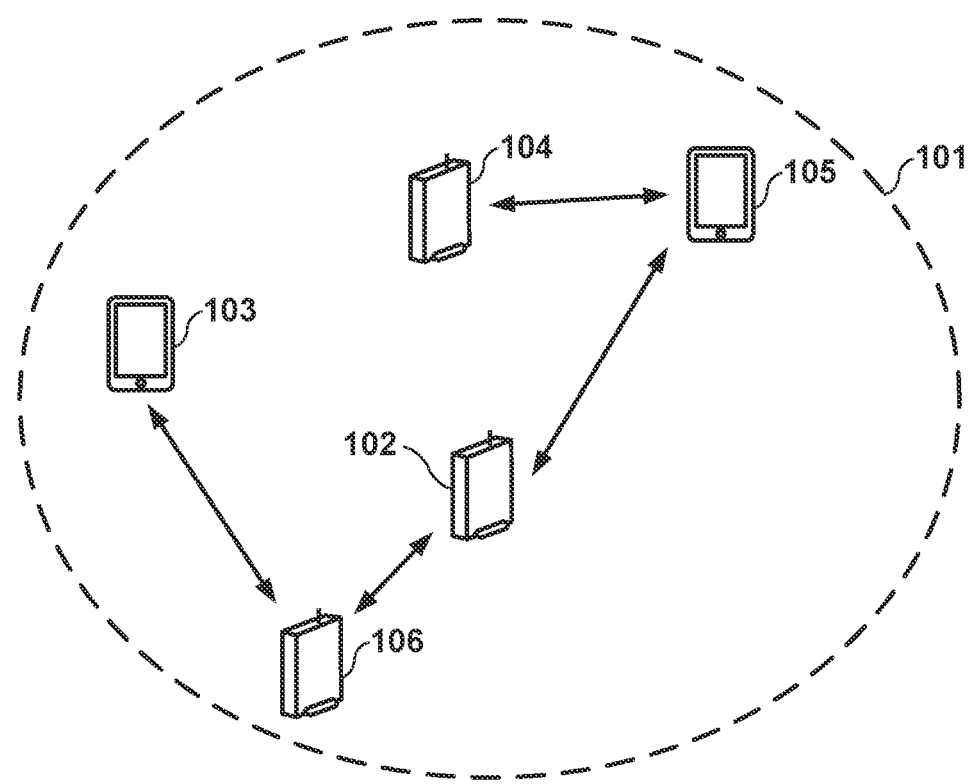
FIG. 1 is a view showing an example of the configuration of a network.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

FIG. 1 shows an example of the configuration of a wireless communication network according to this embodiment. This wireless communication network is configured to include access points (an AP 102, an AP 104, and an AP 106) and terminals (an STA 103 and an STA 105), which comply with IEEE802.11EHT (Extremely High Throughput) devices. In the following description, in a case in which a specific device is not referred to or the like, the access point may be referred to as "AP" and the terminal (station) may be referred to as "STA" without reference numerals. Note that in FIG. 1, the wireless communication network including three APs and two STAs is shown as an example, but the numbers of communication devices may be different from the number shown in FIG. 1, as a matter of course. In addition, it may be understood that EHT is an acronym of Extreme High Throughput.

In FIG. 1, the communicable area of the network formed by the AP 102, the AP 104, and the AP 106 is indicated by a circle 101. Note that this communicable area may cover a larger area, or may cover only a smaller area. In addition, although FIG. 1 shows STAs complying with the IEEE802.11EHT standard, an STA that supports only a standard (legacy standard) of a generation before the IEEE802.11EHT standard may exist.

Note that in this example, each of the AP 102 and the AP 104 or each of the AP 102 and the AP 106 can receive a signal transmitted from the other AP. Note that the connection form is not particularly limited, and the AP 102 and the AP 104 may be connected by a wire or wirelessly. Also, the AP 104 and the AP 106 may be communicable with each other or not. The AP 102, the AP 104, and the AP 106 support the Multi-AP Coordination configuration of the IEEE802.11EHT and can cooperatively concurrently transmit data to one STA. For example, the STA 105 can concurrently transmit/receive radio frames to/from the AP 102 and the AP 104, which cooperatively operate. The STA 105 can be configured to, for example, include a plurality of wireless LAN control units and transmit/receive radio frames to/for a plurality of APs using different radio channels. Note that the STA 105 may include one physical control unit capable of processing a plurality of frames concurrently received via a plurality of radio channels. That is, the STA 105 has a configuration capable of logically concurrently processing a plurality of wireless communications physically using one or a plurality of control devices.

(Device Configuration)

Figure 2:
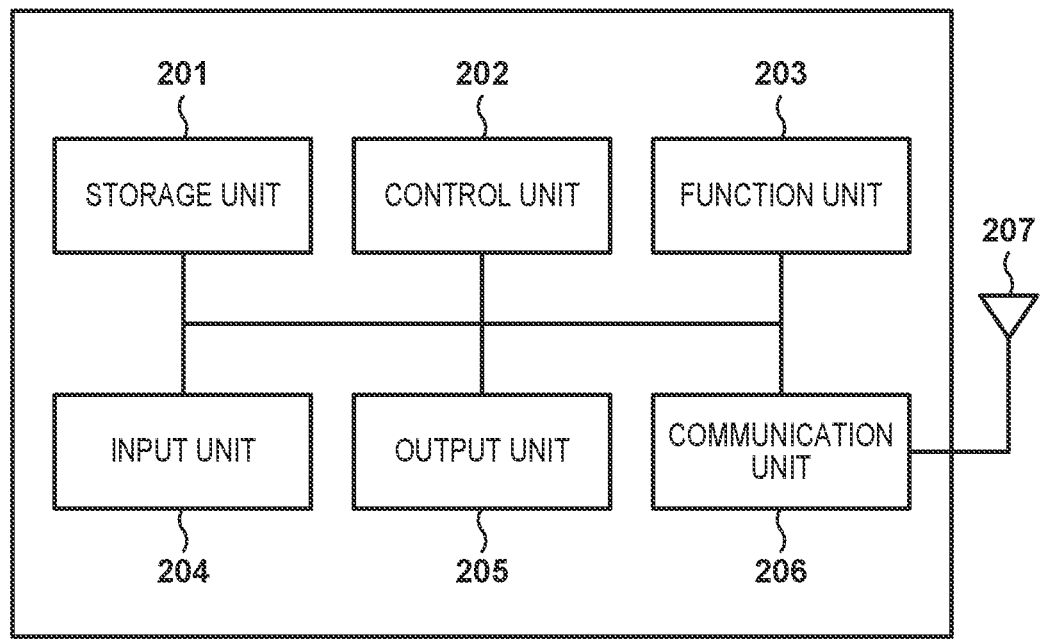
FIG. 2 is a block diagram showing an example of the hardware configuration of an AP or an STA.

FIG. 2 shows the hardware configuration of each of the APs (the AP 102, the AP 104, and the AP 106) and the STAs (the STA 103 and the STA 105). The communication device includes, as an example of its hardware configuration, a storage unit 201, a control unit 202, a function unit 203, an input unit 204, an output unit 205, a communication unit 206, and an antenna 207.

The storage unit 201 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 201.

The control unit 202 is formed by, for example, a processor such as a CPU or an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 202 executes the programs stored in the storage unit 201, thereby controlling the entire device. Note that the control unit 202 may control the entire device by cooperation of the programs stored in the storage unit 201 and an OS (Operating System).

In addition, the control unit 202 controls the function unit 203 to execute predetermined processing such as image capturing, printing, or projection. The function unit 203 is hardware used by the device to execute predetermined processing. For example, if the device is a camera, the function unit 203 is an image capturing unit and performs image capturing processing. For example, if the device is a printer, the function unit 203 is a printing unit and performs print processing. For example, if the device is a projector, the function unit 203 is a projection unit and performs projection processing. Data to be processed by the function unit 203 may be data stored in the storage unit 201, or may be data communicated with another AP or STA via the communication unit 206 to be described later.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE802.11 standard series, or controls IP communication. In this embodiment, the communication unit 206 can execute processing complying with at least the IEEE802.11EHT standard. In addition, the communication unit 206 controls the antenna 207 to transmit and receive radio signals for wireless communication. The device communicates contents such as image data, document data, or video data with another communication device via the communication unit 206. The antenna 207 is an antenna that can transmit and receive signals in at least any one of, for example, a sub-GHz band, 2.4 GHz band, 5 GHz band, and 6 GHz band. Note that the frequency band (and a combination of frequency bands) to which the antenna 207 is adaptable is not particularly limited. The antenna 207 may be one antenna, or may be a set of two or more antennas to perform MIMO (Multi-Input and Multi-Output) transmission/reception. FIG. 2 shows one antenna 207, but the antenna may include two or more antennas (two or more sets of antennas) that are adaptable to different frequency bands. The antenna 207 is configured to be adaptable to communication of Distributed Coordination of the IEEE802.11EHT standard. For example, the AP has a configuration capable of transmitting D-MIMO (Distributed MIMO) for JTX (Joint Transmission).

Note that JTX is one element used to implement the Multi-AP Coordination function that is expected to be newly introduced from the IEEE802.11EHT, and indicates that a plurality of APs cooperatively concurrently transmit data to one STA. The Multi-AP Coordination function is a function of making a plurality of APs cooperatively operate to improve transmission/reception throughput or signal strength on the STA side. As a wireless technology at this time, D-MIMO can be used. D-MIMO is a technique of causing a plurality of APs to communicate with one STA at the same time and same frequency channel (for example, in the same RU (Resource Unit) of OFDMA (Orthogonal Frequency-Division Multiple Access)). According to D-MIMO, since the space use efficiency is improved, high-speed communication can be implemented. The minimum configuration of D-MIMO includes an M-AP (master AP), an S-AP (slave AP), and an STA. In this case, under the control of the M-AP, the two APs, that is, the M-AP and the S-AP cooperatively concurrently (simultaneously) transmit radio frames to one STA.

Figure 3:
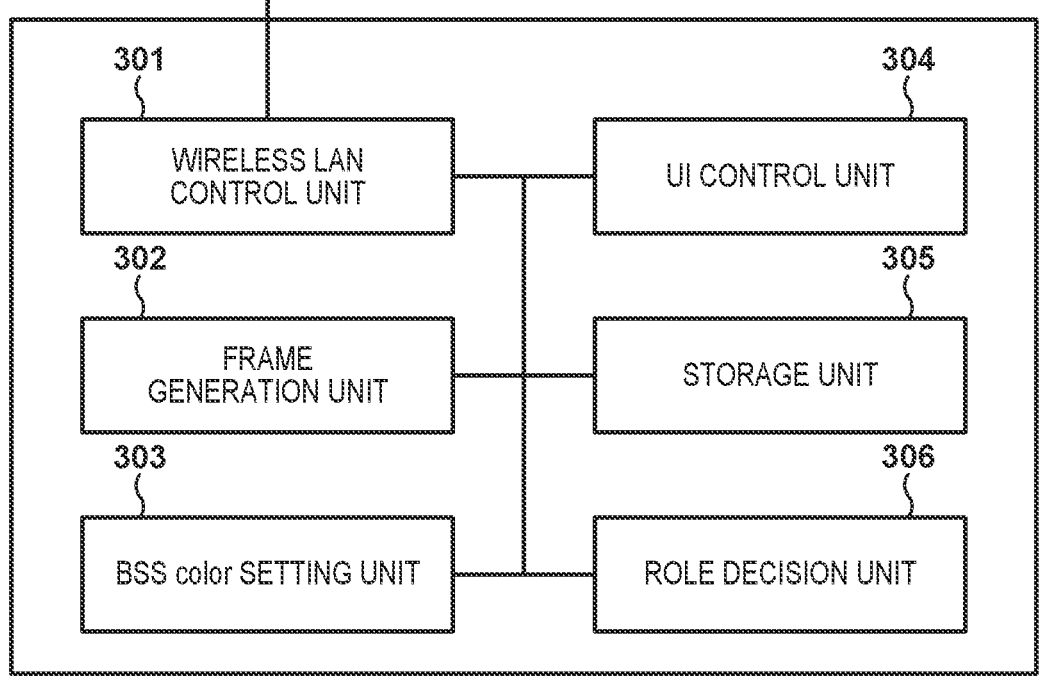
FIG. 3 is a block diagram showing an example of the functional configuration of the AP or the STA.

FIG. 3 shows an example of the functional configuration of each of the communication devices (the AP 102, the AP 104, and the AP 106). As an example, the AP includes a wireless LAN control unit 301, a frame generation unit 302, a BSS color setting unit 303, a UI control unit 304, a storage unit 305, a role decision unit 306, and an antenna 307.

The wireless LAN control unit 301 is configured to include circuits that transmit/receive radio signals to/from another wireless LAN device (for example, another AP or STA), and programs configured to control these. The wireless LAN control unit 301 executes communication control of wireless LAN such as transmission of a frame generated by the frame generation unit 302 and reception of a radio frame from another wireless LAN device in accordance with the IEEE802.11 standard series. The frame generation unit 302 generates a radio frame to be transmitted by the wireless LAN control unit 301 based on, for example, data that is received from another AP and should be transmitted to an STA. In addition, the frame generation unit 302 generates, for example, a radio frame including data that another AP should transmit to an STA or a trigger frame (JTX TF) for instructing the timing of transmitting the radio frame including the data to the STA.

The BSS color setting unit 303 sets the BSS color of a radio frame. For example, when the self-device (the AP 102, the AP 104, or the AP 106) forms a BSS (Basic Service Set), the BSS color setting unit 303 sets a BSS color to be used in the BSS. Note that the BSS color setting unit 303 can set a different BSS color depending on whether to transmit data to the STA cooperatively with another AP. For example, if cooperative transmission with another AP is not to be performed, the BSS color setting unit 303 uses a BSS color set as a default in the self-device or a BSS color different from BSS colors set in other BSSs on the periphery. In this embodiment and the appended claims, if the AP does not perform cooperative transmission, a BSS color concerning the BSS formed by the AP is called the BSS color corresponding to the BSS. That is, a BSS color set in a BSS independently of the relationship with a BSS formed by another AP is the BSS color corresponding to the BSS. On the other hand, when performing cooperative transmission with another AP, the BSS color setting unit 303 sets a BSS color in accordance with the decision of the role decision unit 306 to be described later. That is, when performing cooperative transmission, APs that perform cooperative transmission should transmit radio frames in which the same BSS color is set. For this reason, when performing cooperative transmission, the BSS color is set in consideration of the relationship with another AP. When the BSS color is set by the BSS color setting unit 303, the frame generation unit 302 generates a radio frame in which the BSS color is set. The radio frame includes, for example, not only a frame for data transmission to the STA but also a beacon frame and the like. That is, the AP is in a state in which the BSS using the set BSS color is formed. According to this, since the APs that transmit radio frames by cooperative transmission form BSSs using the common BSS color, the common BSS color is set in the plurality of radio frames cooperatively transmitted and received by the STA. Here, since one of the APs that perform cooperative transmission and the STA are in a connected state, the BSS color of the BSS to which the STA belongs is set in the radio frame received by the STA. For this reason, the STA can handle all of the plurality of radio frames received from the plurality of APs as Intra-BSS frames.

On the other hand, if a state in which cooperative transmission with another AP is not performed is set, the BSS color setting unit 303 can set the BSS color to the default BSS color value. That is, if the BSS color of the self-device was changed to the BSS color of the BSS formed by another AP for cooperative transmission, the BSS color setting unit 303 returns the set value of the BSS color to the initial value. Also, if the BSS color of the self-device was not changed, the BSS color setting unit 303 continues to use the BSS color even after the end of the cooperative transmission. In this case, another AP can return the set value of the BSS color to the initial value. However, if the plurality of BSSs formed by the plurality of APs that perform cooperative transmission originally use the same BSS color, the BSS color need not be changed even after the end of the cooperative transmission. Note that when different BSS colors are used in a plurality of BSSs having adjacent communication areas, the frequency use efficiency can sometimes be improved. For example, the STA can execute different control processes depending on whether a received radio frame is an Intra-BSS frame in which the BSS color of the BSS to which the self-device belongs or an Inter-BSS frame in which another BSS color is set. If the reception power of a radio frame does not exceed a predetermined value, the STA can transmit the radio frame. A predetermined value concerning the Inter-BSS frame can be set to a value higher than a predetermined value concerning an Intra-BSS frame. According to this, even if a radio frame is received by power more than the predetermined value concerning an Intra-BSS frame, the STA may have a transmission opportunity if the radio frame is a radio frame of Inter-BSS. For this reason, when the AP uses a BSS color different from that of another AP, the communication opportunity of the STA can be increased, and the frequency use efficiency of the entire system can be improved. Hence, if the plurality of BSSs formed by the plurality of APs that perform cooperative transmission originally use the same BSS color, at least one of the plurality of APs may change the BSS color.

The UI control unit 304 is configured to include hardware concerning user interfaces (UIs) such as a touch panel and buttons configured to accept an operation on the AP by the user (not shown) of the AP, and programs configured to control these. Note that the UI control unit 304 also has a function of, for example, presenting information to the user, such as display of an image or the like or audio output. The storage unit 305 is configured to include a storage device such as a ROM (Read Only Memory) or a RAM (Random Access Memory) configured to store programs to be executed by the communication device and various kinds of data.

When transmitting a radio frame to a common STA cooperatively with another AP, the role decision unit 306 executes a negotiation with the other AP. By this negotiation, the role decision unit 306 decides whether to operate as an M-AP having a role of controlling cooperative transmission or as an S-AP to be controlled by the M-AP. If the self-device operates as an M-AP, the above-described BSS color setting unit 303 does not change the BSS color (for example, the default value is used). In this case, the BSS color of the BSS formed by another AP that operates as an S-AP is set to the BSS color of the self-device. On the other hand, if the self-device operates as an S-AP, the BSS color setting unit 303 sets the BSS color of the BSS formed by the self-device such that it matches the BSS color of the BSS formed by the M-AR.

Note that the STA has the functions of a general STA. The STA can have a function of receiving a radio frame transmitted by the Multi-AP Coordination configuration.

(Frame Structure)

Figure 4:
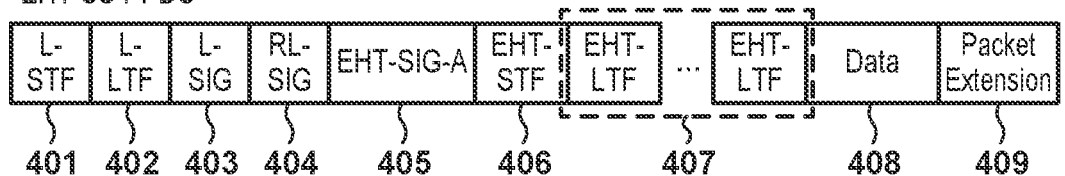
FIG. 4 is a view showing an example of the PHY frame structure of an EHT SU PPDU.
Figure 5:
FIG. 5 is a view showing an example of the PHY frame structure of an EHT ER PPDU.
Figure 6:
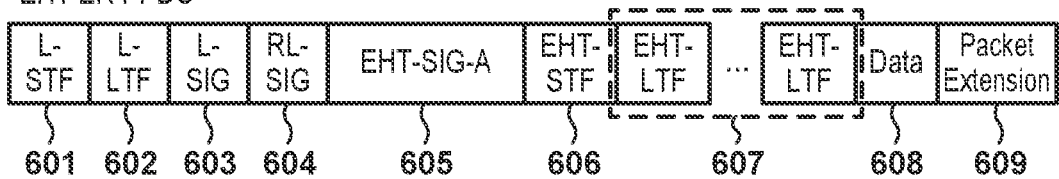
FIG. 6 is a view showing an example of the PHY frame structure of an EHT MU PPDU.

An example of the structure of a PPDU (Physical Layer (PHY) Protocol Data Unit) complying with the IEEE802.11EHT standard will be described with reference to FIGS. 4 to 6. FIG. 4 shows an example of an EHT SU (Single User) PPDU that is a PPDU for single-user communication, and FIG. 5 shows an example of an EHT MU (Multi User) PPDU for multi-user communication. FIG. 6 shows an example of an EHT ER (Extended Range) PPDU for long distance transmission. The EHT ER PPDU is used when the communication area should be extended in communication between an AP and a single STA. Note that the fields of the PPDU need not always be arranged in the orders shown in FIGS. 4 to 6, and may include new fields that are not shown in FIGS. 4 to 6.

The PPDU includes fields including an STF (Short Training Field), an LTF (Long Training Field), and a SIG (Signal Field). As shown in FIG. 4, the head portion of the PPDU includes an L (Legacy)-STF 401, an L-LTF 402, and an L-SIG 403 for ensuring backward compatibility with the IEEE802.11a/b/g/n/ax standards. Note that each of frame formats shown in FIGS. 5 and 6 includes an L-STF (L-STF 501 or L-STF 601), an L-LTF (L-LTF 502 or L-LTF 602), and an L-SIG (L-SIG 503 or RL-SIG 603). Note that the L-LTF is arranged immediately after the L-STF, and the L-SIG is arranged immediately after the L-LTF. Note that each of the structures shown in FIGS. 4 to 6 further includes an RL-SIG (Repeated L-SIG, an RL-SIG 404, RL-SIG 504, or RL-SIG 604) arranged immediately after the L-SIG In the RL-SIG field, the contents of the L-SIG are repeatedly transmitted. The RL-SIG is used to enable a receiver to recognize that this PPDU complies with a standard after the IEEE802.11ax standard, and may be omitted in IEEE802.11EHT in some cases. In addition, a field for enabling the receiver to recognize that this PPDU complies with the IEEE802.11EHT may be provided in place of the RL-SIG The L-STF 401 is used for detection of a physical layer (PHY) frame, AGC (Automatic Gain Control), timing detection, or the like. The L-LTF 402 is used for highly accurate frequency/time synchronization, obtainment of propagation channel information (CSI: Channel State Information), or the like. The L-SIG 403 is used for transmitting control information including information such as a data transmission rate and a PHY frame length. A legacy device complying with the IEEE802.11a/b/g/n/ax standards can decode the above-described various kinds of legacy fields.

Each PPDU further includes an more EHT-SIG (EHT-SIG-A 405, EHT-SIG-A 505, EHT-SIG-B 506, or EHT-SIG-A 605) arranged immediately after the RL-SIG and used for transmitting control information for EHT. Each PPDU further includes an STF for EHT (EHT-STF 406, 507, or 606) and an LTF for EHT (EHT-LTF 407, 508, or 607). Each PPDU includes, after these controlling fields, a data field 408, 509, or 608 and a Packet extension field 409, 710, or 609. The portion including the fields from the L-STF to the EHT-LTF of each PPDU is referred to as a PHY preamble.

Note that each of FIGS. 4 to 6 shows the PPDU that can ensure the backward compatibility as an example. However, if it is unnecessary to ensure the backward compatibility, for example, the legacy fields may be omitted. In this case, for example, the EHT-STF and EHT-LTF are used in place of the L-STF and the L-LTF to establish synchronization. In this case, the EHT-STF and one of the plurality of EHT-LTFs after the EHT-SIG field can be omitted.

The EHT-SIG-A 405 and 605 included in the EHT SU PPDU and the EHT ER PPDU include an EHT-SIG-A1 and an EHT-SIG-A2 necessary for reception of the PPDU, respectively, as shown in Tables 1 and 2 below. A 6-bit "BSS color" subfield is included in the EHT-SIG-A1. Also, the EHT-SIG-A 505 of the EHT MU PPDU shown in FIG. 5 includes an EHT-SIG-A1 and an EHT-SIG-A2 necessary for reception of the PPDU as shown in Tables 3 and 4 below. In the PPDU as well, a 6-bit "BSS color" subfield is included in the EHT-SIG-A1. Note that the configurations of Tables 1 to 4 are merely examples, and information other than the information shown in these tables may be included in the EHT-SIG field, and some of the pieces of information shown in these tables may be excluded from the EHT-SIG field.

TABLE 1

| | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
| | B1 | Beam Change | 1 | "1" is set if the pre-EHT of the PPDU is arranged in a space different from the first symbol of the EHT-LTF, or "0" is set if the pre-EHT is mapped similarly to the first symbol. |
| | B2 | UL/DL | 1 | This subfield indicates whether the PPDU is for UL or DL, and has the same value as TXVECTOR UPLINK_FLAG. |
| | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B7 | DCM | 1 | This subfield indicates whether Dual Carrier Modulation is applied to the data field. If "0" is set in STBC field, "1" is set. (If both the DCM and STBC fields are "1", neither of them is applied) If DCM is not applied, "0" is set. |
| | B8-B13 | BSS Color | 6 | 6-bit number for identifying the BSS |
| | B14 | Reserved | 1 | Reserved field |
| | B15-B18 | Spatial Reuse | 4 | This subfield indicates whether Spatial Reuse is allowed during transmission of this PPDU. The value of Spatial Reuse field encoding shown in the separate table is set. |
| | B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| | B21-B22 | GI + LTF Size | 2 | This subfield indicates the Guard Interval period and the EHT-LTF size. "0" is set for 1 × EHT-LTF and 0.8 μs GI, "1" is set for 2 × EHT-LTF and 0.8 μs GI, "2" is set for 2 × EHT-LTF and 1.6 μs GI, "3" is set if both the DCM and STBC fields are "1" and for 4 × EHT-LTF and 0.8 μs GI, or "3" is set for 4 × EHT-LTF other than the above case and 3.2 μs GI. |
| | B23-B25 | NSTS And Midamble Periodicity | 2 | This subfield indicates the number of space-time streams and the midamble period for frame synchronization. If the Doppler field is "0", "(the number of space-time streams) − 1" is set. |

TABLE 1-continued

| Bit Position | Subfield | Bit Count | Description |
|---|---|---|---|
| | | | If the Doppler field is "1", B23 and B24 indicate the number of space-time streams. B25 is "0" if the midamble period is 10, or "1" if the midamble period is 20. |

TABLE 2

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| | B7 | Coding | 1 | "0" is set for BCC (Binary Convolutional Code), or "1" is set for LDPC (Low Density Parity Check). |
| | B8 | LDPC Extra Symbol Segment | 1 | This subfield indicates the presence/absence of an extra OFDM symbol segment for LDPC. |
| | B9 | STBC | 1 | "1" is set in this field if STBC (Space-Time Block Coding) is used and the DCM subfield is "0", "1" is also set if neither DCM nor STBC is applied, or "0" is set otherwise. |
| | B10 | Beamformed | 1 | "1" is set if beamforming steering is applied to the waveform of SU transmission. |
| | B11-B12 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B13 | PE Disambiguity | 1 | Disambiguity field of Packet Extension |
| | B14 | Reserved | 1 | Reserved field |
| | B15 | Doppler | | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| | B16-B19 | CRC | 4 | The CRC of the EHT-SIG-A (26 bits of A1 and 16 bits up of B15 of A2, that is, 42 bits in total) field up to here. |

TABLE 2-continued

| Bit Position | Subfield | Bit Count | Description |
|---|---|---|---|
| B20-B25 | Tail | 6 | An area to set "0" to indicate the end portion to a trellis convolution decoder. |

TABLE 3

| | Bit Position | Subfield | Bit Count | Description |
|---|---|---|---|---|
| EHT SIG-A1 | B0 | UL/DL | 1 | This subfield indicates whether the PPDU is for UL or DL, and has the same value as TXVECTOR UPLINK_FLAG |
| | B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5, "6" and "7" are reserved areas. |
| | B4 | SIGB DCM | 1 | "1" is set if the HT-SIG-B field is modulated using DCM. |
| | B5-B10 | BSS Color | 6 | 6-bit number for identifying the BSS |
| | B11-B14 | Spatial Reuse | 4 | This subfield indicates whether Spatial Reuse is allowed during transmission of this PPDU. The value of Spatial Reuse field encoding shown in the separate table is set. |
| | B15-B17 | Bandwidth | 3 | "0" is set for 20 MHz, "1" is set for 40 MHz, or "3" is set for 160 MHz, (80 + 80 MHz). When the SIGB Compression field is "0", "4" is set if only the secondary 20 MHz is puncturing in 80 MHz preamble puncturing. "5" is set if two 20 MHz of the secondary 40 MHz are puncturing in 80 MHz preamble puncturing, "6" is set if only the secondary 20 MHz is puncturing in 160 (or 80 + 80) MHz preamble puncturing, or "7" is set if only the secondary 40 MHz is puncturing in 160 (or 80 + 80) MHz preamble puncturing. If the SIGB field is "1", the value between "4" to "7" means "reserved". |
| | B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. |

TABLE 3-continued

| Bit Position | Subfield | Bit Count | Description |
|---|---|---|---|
| | | | If at least one receiving terminal has set the capability of supporting the number of EHT SIG-B OFDM symbols larger than 16 to "0", "15" is set to indicate that the number of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| B22 | SIG Compression | 1 | "1" is set if a Common field exists in the EHT-SIG-B. |
| B23-B24 | Gi + LTF Size | 2 | This subfield indicates the Guard Interval period and the EHT-LTF size. "0" is set for 4 × EHT-LTF and 0.8 μs GI, "1" is set for 2 × EHT-LTF and 0.8 μs GI, "2" is set for 2 × EHT-LTF and 1.6 μs GI, or "3" is for 4 × EHT-LTF and 3.2 μs GI. |
| B25 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |

TABLE 4

| | Bit Position | Subfield | Bit Count | Description |
|---|---|---|---|---|
| EHT-SIG-A2 | B0-B6 | TXOP | 1 | Transmission Opportunity If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATTON/8 (round down) is set in B1 to B6. If B0 is "1", FLOOR of (TXOP_DURATION − 512)/8 is set in B1 to B6. |
| B7 | Reserved | 1 | Reserved field |
| B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs. "3" is set for six EHT-LTFs, or "4" is set for eight EHT-LTFs. When the Doppler field is "1", B8 and B9 indicate the number of EHT-LTF symbols, and B10 indicates the midamble period. |
| B11 | LDPC Extra Symbol Segment | 1 | This subfield indicates the presence/absence of an extra OFDM symbol segment for LDPC. |
| B12 | STBC | 1 | When the number of users of each RU (Resource Unit) is not larger than 1, "1" is set to indicate that STBC is used for encoding. |
| B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| B15 | PE Disambiguity | 1 | Disambiguity field of Packet Extension |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution + decoder. |

(Procedure of Processing)

Figure 7:
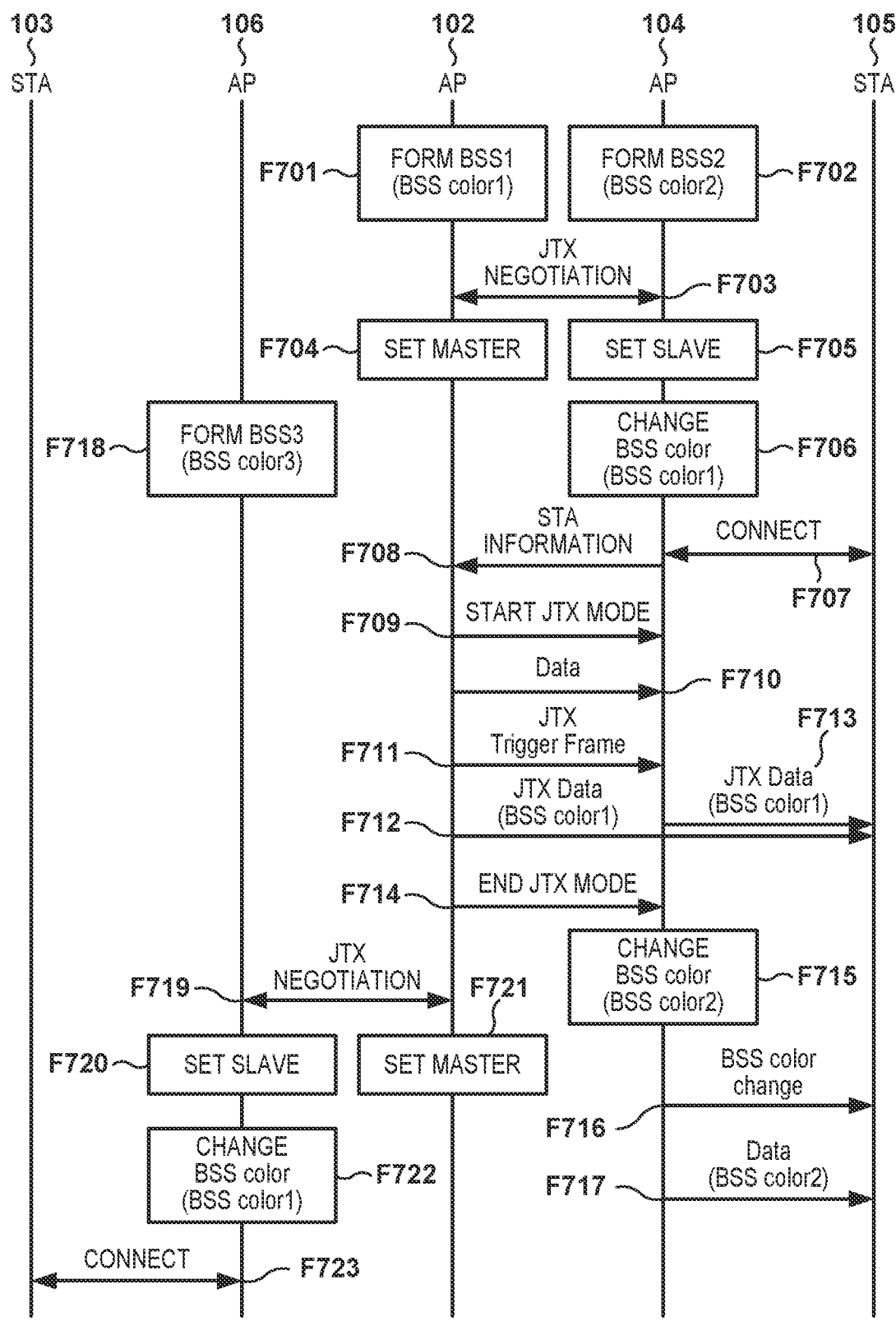
FIG. 7 is a sequence chart showing an example of the procedure of processing executed in the network.
Figure 8:
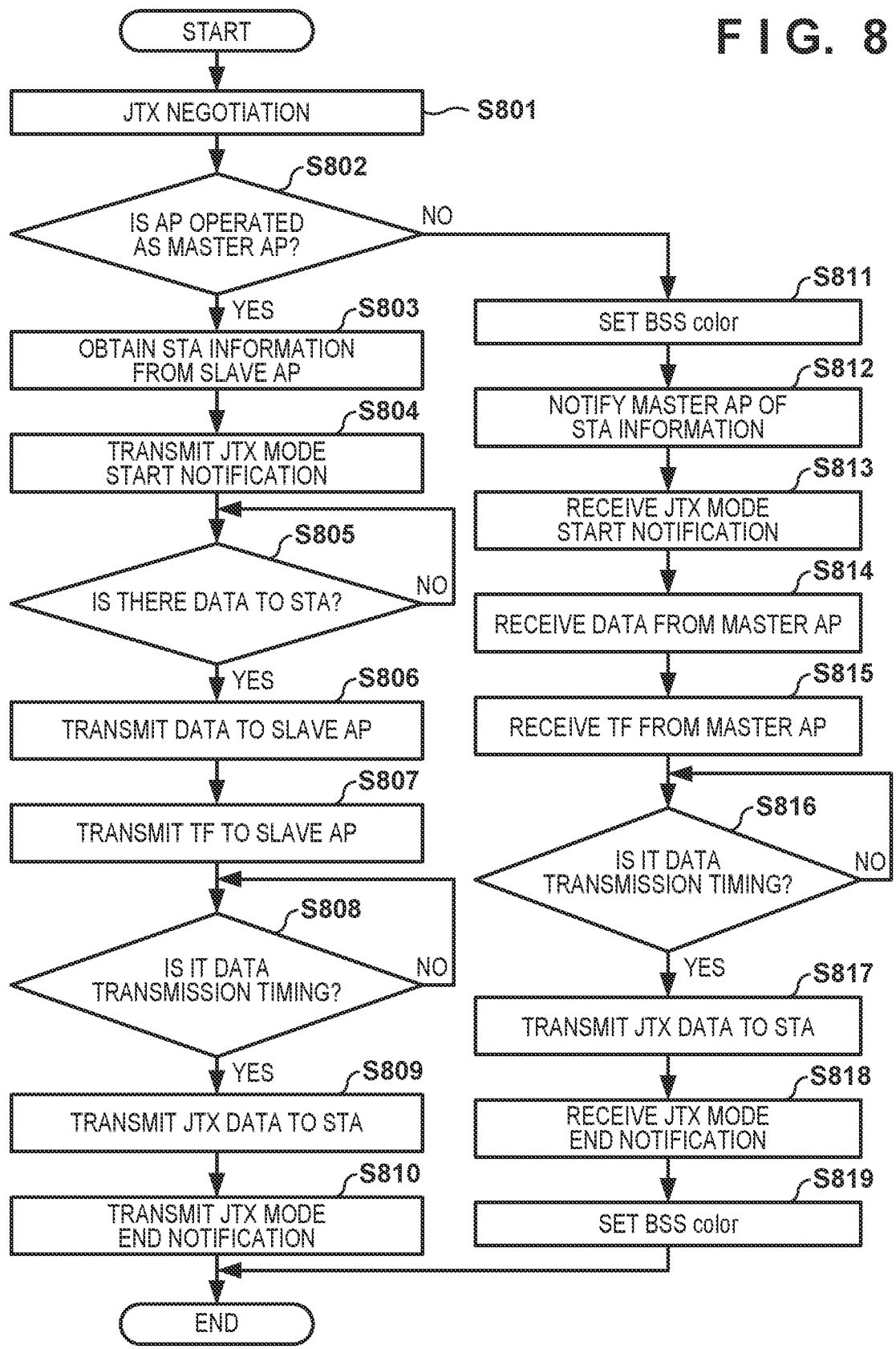
FIG. 8 is a flowchart showing an example of the procedure of processing executed in the AP.

Examples of the procedure of processing executed by an AP as described above and the procedure of processing executed by a wireless communication network will be described next with reference to FIGS. 7 and 8. FIG. 7 shows an example of the procedure of processing in the wireless communication network, and FIG. 8 shows an example of the procedure of processing executed by each AP. Note that in this example, the AP 102 forms a first BSS (BSS1) (F701), and the AP 104 forms a second BSS (BSS2) (F702). Here, in this embodiment, a setting for using BSS color1 is done in the BSS1, and a setting for using BSS color2 different from BSS color1 is done in the BSS2. Each AP notifies Beacon of IEEE802.11 at a predetermined period and accepts a connection request from the STA, thereby setting a state in which the AP mediates communication between the STA and another STA or between the STA and a DS (Distribution System).

After that, the AP 102 and the AP 104 decide to cooperatively concurrently perform data transmission to a common STA. For example, upon detecting that there exists an enormous amount of data to be transmitted to the STA 105, the AP 104 can decide to transmit the data to the STA 105 cooperatively with the AP 102 that is another AP existing on the periphery. Also, even if there does not exist a plan of a mass data communication to a specific STA, the AP 102 or the AP 104 may decide to prepare for cooperative transmission with another AP in preparation for occurrence of mass data communication in the future. If it is decided to perform cooperative transmission by a plurality of APs or make a preparation for that, the AP 102 and the AP 104 perform a negotiation for JTX (Joint Transmission) (F703, step S801). Note that the negotiation for JTX will sometimes simply be referred to as "negotiation" hereinafter. In the negotiation, the AP that executes the negotiation can decide whether to operate as an M-AP or an S-AP. Here, the AP 102 decides to operate as an M-AP (F704, YES in step S802), and the AP 104 decides to operate as an S-AP (F705, NO in step S802). Additionally, in this negotiation, which AP should be associated with the STA as the target of JTX may be decided.

When the role of each AP is decided by the negotiation, the BSS color is set. That is, the S-AP sets the BSS color of the BSS formed by the self-device to the same value as the BSS color of the M-AP. In this example, the AP 104 changes the BSS color of the BSS2 formed by the self-device from BSS color2 to BSS color1 (F706, step S811). Note that the S-AP can obtain the information of the BSS color of the M-AP during the negotiation. However, the present invention is not limited to this and, for example, the S-AP operates as an STA, receives a radio frame from the M-AP, and analyzes the PHY preamble (or the MAC (Medium Access Control) header) of the radio frame, thereby obtaining the information of the BSS color. The radio frame here can be, for example, a Beacon or Probe response frame. For example, the AP 104 can transmit a Probe request frame, and in response to this, the AP 102 can transmit a Probe response including an operation information element including a BSS color. This operation information element is, for example, an EHT Operation element and can be configured as contents compatible with the HE Operation element of IEEE802.11ax. Alternatively, the M-AP may transmit a radio frame for a BSS color notification to the S-AP after the end of the negotiation, and the S-AP may thus obtain the information of the BSS color to be set. The S-AP may obtain the information of the BSS color of the BSS formed by the M-AP by a method other than those described above. Here, if an STA (not shown) belonging to the BSS2 formed by the AP 104 exists, the AP 104 notifies the STA that the BSS color is changed. Note that the AP 102 operates as the M-AP and therefore maintains the BSS color1 corresponding to the BSS1 without changing it. Note that in this example, a case in which the negotiation is performed in a state in which the AP 104 has formed the BSS2 in which BSS color2 is used has been described. However, the present invention is not limited to this and, for example, the negotiation may be started in a state in which the AP 104 has not formed the BSS2. In this case, the AP that is decided by the negotiation to operate as an S-AP sets the BSS color used in the BSS formed by the M-AP as the BSS color to be used in the BSS to be newly formed. This makes it possible to share the BSS color used between the BSSs formed by the M-AP and the S-AP.

After that, the AP 104 executes a connection procedure with the STA 105 and transitions to a connected state (F707). With this connection procedure, the AP notifies the STA of the information of the operation state, as in IEEE802.11ax. The information of the operation state includes the value of the BSS color. The BSS color is 6-bit information for identifying the BSS included in the preamble of the physical layer (PHY), as described above. Based on the value of the BSS color, the STA can grasp whether a received radio frame is a frame of a BSS (intra-BSS) to which the STA belongs or a frame of a BSS (inter-BSS) to which the STA does not belong.

When the connection to the STA 105 is established, the AP 104 notifies the AP 102 of the information of the STA 105 (F708, steps S803 and S812). Here, the information of the STA can include the information of the MAC address of the STA, and the like. Note that as for an STA connected at the time of negotiation, the S-AP may notify the M-AP of the information of the STA at the time of negotiation. The information of the STA connected to the S-AP may be notified at another timing from the S-AP to the M-AP. Also, the AP 102 may notify the AP 104 of the information of the STA connected to the self-device. If the AP 102 and the AP 104 perform JTX to transmit data to a specific STA, the information of the STA may be notified from the AP connected to the STA to the other AP. However, since the M-AP can designate the STA as the data transmission target, in transmission of the transmission target data to be described later or a JTX trigger frame, the information need not always be provided from the M-AP to the S-AP at this point of time.

After that, the AP 102 notifies the AP 104 operating as the S-AP of the start of the JTX mode (F709, steps S804 and S813). Note that in the above description, the AP 104 changes the BSS color after the negotiation and before the JTX mode start notification. For example, the BSS color may be changed in accordance with the reception of the JTX mode start notification. According to this, if the time from the end of the negotiation to the start of the operation in the JTX mode is long, unnecessary BSS color integration between the APs can be prevented, and the frequency use efficiency of the entire system can be improved. On the other hand, when the BSS color is shared immediately after the negotiation, it is unnecessary to perform processing of changing the BSS color after the start of the JTX mode. Hence, if data to the STA is generated, the data can immediately be transmitted to the STA by JTX.

After the AP 102 and the AP 104 start the operation in the JTX mode, when transmission target data to the STA 105 is generated (YES in step S805), the transmission target data is transmitted from the AP 102 to the AP 104 (F710, steps S806 and S814). Instead of immediately transmitting the received data to the STA 105, the AP 104 temporarily holds the received data because it is operating in the JTX mode.

After transmission/reception of the transmission target data, the AP 102 transmits a JTX trigger frame (TF) to the AP 104 to cause the AP 104 to transmit a radio frame including the transmission target data (F711, steps S807 and S815). By the JTX TF, the AP 102 can instruct the AP 104 to transmit the radio frame to the STA 105 and designate the timing of transmission. For example, at the timing designated by the JTX TF (YES in step S808, YES in step S816), the AP 102 and the AP 104 concurrently transmit the data to the STA 105 (F712, F713, steps S809 and S817). Note that the transmission timing can be a timing after the elapse of a predetermined time (SIFS, Short Inter Frame Space) from transmission/reception of the JTX TF. In this case, the transmission timing is instructed by transmission/reception itself of the JTX TF. In this case, the JTX TF can be transmitted at a timing according to the timing when the AP 102 and the AP 104 should transmit the radio frame to the STA 105. Alternatively, information for designating the transmission timing may be included in the frame of the JTX TF. In this case, using the designated transmission timing and a timer or clock in the self-device, the AP 102 and the AP 104 can decide when the radio frame should be transmitted. As described above, using the JTX TF, the AP 102 and the AP 104 can synchronously transmit the radio frame. Note that the radio frame is the PPDU shown in one of FIGS. 4 to 6, and a value representing BSS color1 set in each BSS is stored in the BSS color subfield, As described above. In the EHT SU PPDU or EHT ER PPDU, the BSS color subfield is set in the ninth to 14th bits (B8 to B13) of EHT-SIG-A1, as shown in the table above. Also, in the EHT MU PPDU, the BSS color subfield is set in the sixth to 11th bits (B5 to B10) of EHT-SIG-A1.

After that, the AP 102 decides to end the JTX mode based on, for example, the absence of transmission target data to the STA 105, and transmits a JTX mode end notification to the AP 104 (F714, steps S810 and S818). Note that the AP 102 and the AP 104 can decide to end the JTX mode in various cases, for example, if there is no STA to which an enormous amount of data is to be transmitted, or if the number of connected STAs exceeds a predetermined number to cause a shortage in the radio resource needed for JTX.

Upon receiving the JTX mode end notification, the AP 104 returns the BSS color to the value (BSS color2) of the BSS color before the change (F715, step S819). At this time, since the setting of the BSS color is changed, the AP 104 notifies the connected STA 105 that the BSS color is changed (F716). The STA 105 thus handles a radio frame of BSS color2 as an Intra-BSS frame. After that, w % ben data is transmitted from the AP 104 to the STA 105, a radio frame in which BSS color2 is set is transmitted (F717).

Assume that, after that, the AP 102 and the AP 106 decide to perform JTX. In this case, these APs execute a JTX negotiation, as in the above-described case, and the AP decided to operate as an S-AP matches the BSS color of the self-device with the BSS color of the M-AP (F718 to F722). Assume that, after that, the STA 103 executes connection processing to the AP 106 and transitions to the connected state (F723). According to this, the processes of F708 to F713 are executed between the AP 102 and the AP 106, and a radio frame in which the BSS color is set to BSS color1 is transmitted by JTX from each of the AP 102 and the AP 106 to the STA 103. Note that as described above, BSS color2 different from BSS color1 transmitted from the AP 102 and the AP 106 is set in a radio frame transmitted between the AP 104 and the STA 105. Hence, for example, the transmission opportunity of radio frames to the STA 105 can be increased as compared to a case in which the BSS color is shared.

As described above, when the BSS color is shared in a case in which a plurality of APs cooperatively transmit radio frames to a common STA, the STA can handle the received radio frame as an Intra-BSS frame. In addition, when the BSS color of the S-AP (or M-AP in some cases) is changed based on the end of cooperative transmission, a radio frame in an adjacent BSS is handled as an Inter-BSS frame in a case in which cooperative transmission is not performed. As a result, the probability that the STA can obtain transmission opportunity rises, and the frequency use efficiency of the entire system can be improved.

According to the present invention, it is possible to appropriately execute a setting for causing a plurality of access points to concurrently transmit data to a terminal.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An access point device comprising:
   at least one memory that stores a set of instructions; and
   at least one processing circuit,
   wherein the access point device is caused, by at least one of the at least one processing circuit executing the instructions or the at least one processing circuit operating, to perform operations comprising:
   forming a first Basic Service Set (BSS);
   transmitting, in coordination with another access point device, radio communication data addressed to a common station device which is a common destination of the radio communication data transmitted by the access point device and the other access point device in a coordinated manner,
   wherein, in a case where the radio communication data is to be transmitted to the common station device in the coordinated manner by the access point device and the other access point device, a first BSS color corresponding to the first BSS and a second BSS color corresponding to a second BSS formed by the other access point device are set to be a same color; and
   making, based on a negotiation with the other access point device, a decision of whether to set the BSS color in the first BSS to the first BSS color corresponding to the first BSS or to a second BSS color corresponding to the second BSS, in a case where the radio communication data is to be transmitted to the common station device in the coordinated manner by the access point device and the other access point device,
  wherein, in the negotiation, which one of the access point device and the other access point device operates as a master access point for a coordinated transmission of the radio communication data to the common station device is decided, and
  wherein in a case where the access point device decides by the negotiation that the other access point device operates as the master access point, the access point device decides to set the BSS color in the first BSS to the second BSS color.

2. The access point device according to claim 1, wherein the access point device is caused, by at least one of the at least one processing circuit executing the instructions or the at least one processing circuit operating, to perform operations comprising:
  in a case where the access point device decides by the negotiation that the access point device operates as the master access point, deciding to set the BSS color in the first BSS to the first BSS color,
  wherein the other access point device sets the BSS color in the second BSS to the first BSS color.

3. The access point device according to claim 1, wherein after the BSS color in the first BSS is set to the second BSS color, the access point device performs a setting for changing the BSS color in the first BSS from the second BSS color to the first BSS color in accordance with an end of a coordinated transmission of the radio data to the common station device.

4. The access point device according to claim 3, wherein in a case where the access point device decides to set the BSS color in the first BSS to the second BSS color in a state in which the first BSS color is used in the first BSS, the access point device performs a setting for changing the BSS color in the first BSS to the second BSS color before the coordinated transmission of the radio data to the common station device is started.

5. The access point device according to claim 3, wherein in a case where the access point device decides to set the BSS color in the first BSS to the second BSS color in a state in which the first BSS color is used in the first BSS, the access point device performs a setting for changing the BSS color in the first BSS from the first BSS color to the second BSS color based on a start of the coordinated transmission of the radio data to the common station device.

6. The access point device according to claim 1, wherein
  the access point device makes the decision before the access point device forms the first BSS, and
  the access point device forms the first BSS that is set to use the BSS color based on the decision.

7. The access point device according to claim 1, the operations further comprising notifying, in a case where the BSS color in the first BSS is changed, another communication device belonging to the first BSS that the BSS color is changed.

8. The access point device according to claim 1, wherein the access point device obtains information of the second BSS color by the negotiation.

9. The access point device according to claim 1, wherein the access point device operates as a terminal capable of communicating with the other access point device and receives a radio frame from the other access point device, thereby obtaining information of the second BSS color.

10. The access point device according to claim 1, wherein the radio communication data transmitted by the access point device is a radio frame including a preamble and a data field of a physical layer (PHY),
  the preamble includes:
  a Legacy Short Training Field (L-STF);
  a Legacy Long Training Field (L-LTF) arranged immediately after the L-STF in the radio frame;
  a Legacy Signal Field (L-SIG) arranged immediately after the L-LTF in the radio frame;
  an Extremely High Throughput (EHT) Signal Field (EHT-SIG-A) arranged after the L-SIG in the radio frame;
  an EHT Short Training Field (EHT-STF) arranged after the EHT-SIG-A in the radio frame; and
  an EHT Long Training Field (EHT-LTF) arranged immediately after the EHT-STF in the radio frame,
  the EHT-SIG-A includes a subfield for setting the BSS color, and
  the access point device transmits the radio frame including, in the subfield, a value that designates the BSS color that is set.

11. The access point device according to claim 1, wherein each of the access point device and the other access point device is an access point complying with IEEE802.11EHT, and the common station device is a station complying with IEEE802.11EHT.

12. A control method executed by an access point device, comprising:
  forming a first Basic Service Set (BSS);
  transmitting, in coordination with another access point device, radio communication data addressed to a common station device which is a common destination of the radio communication data transmitted by the access point device and the other access point device in a coordinated manner,
  wherein, in a case where the radio communication data is to be transmitted to the common station device in the coordinated manner by the access point device and the other access point device, a first BSS color corresponding to the first BSS and a second BSS color corresponding to a second BSS formed by the other access point device are set to be a same color; and
  making, based on a negotiation with the other access point device, a decision of whether to set the BSS color in the first BSS to the first BSS color corresponding to the first BSS or to a second BSS color corresponding to the second BSS, in a case where the radio communication data is to be transmitted to the common station device in the coordinated manner by the access point device and the other access point device,
  wherein, in the negotiation, which one of the access point device and the other access point device operates as a master access point for a coordinated transmission of the radio communication data to the common station device is decided, and
  wherein in a case where the access point device decides by the negotiation that the other access point device operates as the master access point, the access point device decides to set the BSS color in the first BSS to the second BSS color.

13. A non-transitory computer-readable storage medium that stores a program for causing, executed by a computer included in an access point device, the computer to:
  form a first Basic Service Set (BSS);
  transmit, in coordination with another access point device, radio communication data addressed to a common station device which is a common destination of the radio communication data transmitted by the access point device and the other access point device in a coordinated manner, wherein, in a case where the radio communication data is to be transmitted to the common station device in the coordinated manner by the access point device and the other access point device, a first BSS color corresponding to the first BSS and a second BSS color corresponding to a second BSS formed by the other access point device are set to be a same color; and make, based on a negotiation with the other access point device, a decision of whether to set the BSS color in the first BSS to the first BSS color corresponding to the first BSS or to a second BSS color corresponding to the second BSS, in a case where the radio communication data is to be transmitted to the common station device in the coordinated manner by the access point device and the other access point device, wherein, in the negotiation, which one of the access point device and the other access point device operates as a master access point for a coordinated transmission of the radio communication data to the common station device is decided, and wherein in a case where the access point device decides by the negotiation that the other access point device operates as the master access point, the access point device decides to set the BSS color in the first BSS to the second BSS color.

* * * * *